United States Patent [19]

Harris et al.

[11] 4,043,673

[45] Aug. 23, 1977

[54] RETICLE CALIBRATED DIAMETER GAUGE

[75] Inventors: David E. Harris; Robert M. Watson; John D. Redmyer, all of Columbus, Ohio

[73] Assignee: Autech Corporation, Worthington, Ohio

[21] Appl. No.: 566,413

[22] Filed: Apr. 9, 1975

[51] Int. Cl.² .............................................. G01B 11/10
[52] U.S. Cl. ................................. 356/160; 250/560; 250/571; 356/167
[58] Field of Search ...................... 356/159, 160, 167; 250/559, 560, 561, 562, 563, 571, 572

[56] References Cited

U.S. PATENT DOCUMENTS

| 3,743,428 | 7/1973 | Brown | 356/160 |
|---|---|---|---|
| 3,829,220 | 8/1974 | Parkinson | 356/160 |
| 3,856,412 | 12/1974 | Zanoni | 356/160 |
| 3,870,890 | 3/1975 | Binks et al. | 356/160 |

Primary Examiner—John K. Corbin
Assistant Examiner—R. A. Rosenberger
Attorney, Agent, or Firm—Cennamo, Kremblas & Foster

[57] ABSTRACT

A non-contact optical gauging device in which a laser beam is deflected to produce a bidirectional scan. The beam is split; a measuring portion scans an object being inspected while the other portion scans a calibration reticle having alternating opaque and transparent bands. The alternating transmission and ocultation of the beam through the reticle is used to generate calibration pulses, each representing a predetermined increment of movement of the calibration beam. Ocultation of the measuring beam by the object being measured generates a signal which is used to control counting of the calibration pulses as an indication of the dimension being measured. Bidirectional averaging is employed to minimize errors due to object motion in the direction of beam scanning. Variations are disclosed in which two measuring beams and one or two calibration beams, are employed for measuring large objects or for dual axis measurement, the latter by orthogonal projection onto the object being measured.

24 Claims, 16 Drawing Figures

RETICLE CALIBRATED DIAMETER GAUGE

INTRODUCTION AND BACKGROUND

This invention relates to non-contact optical gauging apparatus, and more particularly to such apparatus for accurate measurement of diameter or other linear dimensions.

Many devices are available for such purposes, but the device here disclosed possesses a combination of several advantages seemingly absent from other available devices. These advantages include absence of the need for contact with the object being measured, permanent calibration, capacity for high measurement rate, simplicity of construction and relatively low cost. Of particular importance are relative independence of the position of the object in the measurement field, and of regular or random movement during measurement. Moreover, the device is capable of high resolution, and of accuracy comparable to the resolution.

BRIEF DESCRIPTION OF THE INVENTION

According to the invention, these results are achieved by employment of a laser and a beam scanning mechanism. The scanned beam is split into a measuring component and a calibrating component. The latter scans across a calibrating grid or reticle, which has alternating opaque and transparent bands. This is used to generate a series of pulses of fixed spacing; i.e., a "spatial clock". The measuring beam is arranged to be intercepted by the object being measured. A photodetector behind the object is thus illuminated when the scanned beam is off the object and dark from the time the beam encounters the object until it clears the object. Since the calibrating pulses are of fixed spatial frequency, i.e. so many pulses per unit distance of beam travel on the reticle, counting the number of calibrating pulses during the occultation of the measuring beam yields a distance measurement proportional to the dimension of the object along the line traced by the measuring beam. By appropriate selection of grid spacing on the reticle, the relative lengths of the two scanned beams and the pulse counting circuitry, direct digital read out of the measured dimension can be achieved.

If the object happens to be in motion along the line traced by the measuring beam, it may be understood that the object will appear elongated if it is moving in the same direction as the scanning beam, and compressed if it is moving opposite to the beam. According to the present invention, this inaccuracy is overcome by averaging the measurement over both directions of scan.

As will be appreciated use of the scanned split laser beam allows non contact measurement at a high production rate. Use of the calibrating reticle, a particularly unique feature, provides permanent calibration since the reticle grid dimensions do not vary with time. The spatial frequency counting technique yields a simple, reliable and accurate device and also facilitates bidirectional averaging to produce the desired freedom from inaccuracy due to object motion.

Another feature of the invention is the ready adaptability to a variety of measuring applications such as measurement of diameter of objects such as fine wire or sewer pipe, measurement of sheet width, or even simultaneous measurement of orthogonal dimensions. The latter is particularly useful for eccentricity measurements on tubing, for example.

Accordingly, it is among the objects of this invention:

To provide an improved non contact optical gauging device;

To provide such a device in which a measuring beam is adapted to scan back and forth through a measurement field, and in which errors due to object motion are compensated for;

To provide such a device having fixed calibration;

To provide such a device in which calibration is achieved by scanning a laser beam across a grating or reticle leaving alternating opaque and transparent bands to generate a series of pulses of fixed spatial frequency;

To provide such a device in which measurement is made by counting calibration pulses while the measuring beam is blocked by the object being measured;

To provide such a device in which errors due to object movement are overcome by counting and averaging caliberating pulses for two successive measurement scans in opposite directions;

To provide such a device in which relative beam lengths and reticle dimensions are selected to provide direct digital readout for the average of two scans; and To provide such a device which is capable of adaptation for measurement of large and small diameters, sheet widths, eccentricity, etc.

The exact nature of this invention, as well as other objects and advantages thereof will be apparent from consideration of the following detailed description, and the accompanying drawing in which.

DETAILED DESCRIPTION OF INVENTION

Figure 1:
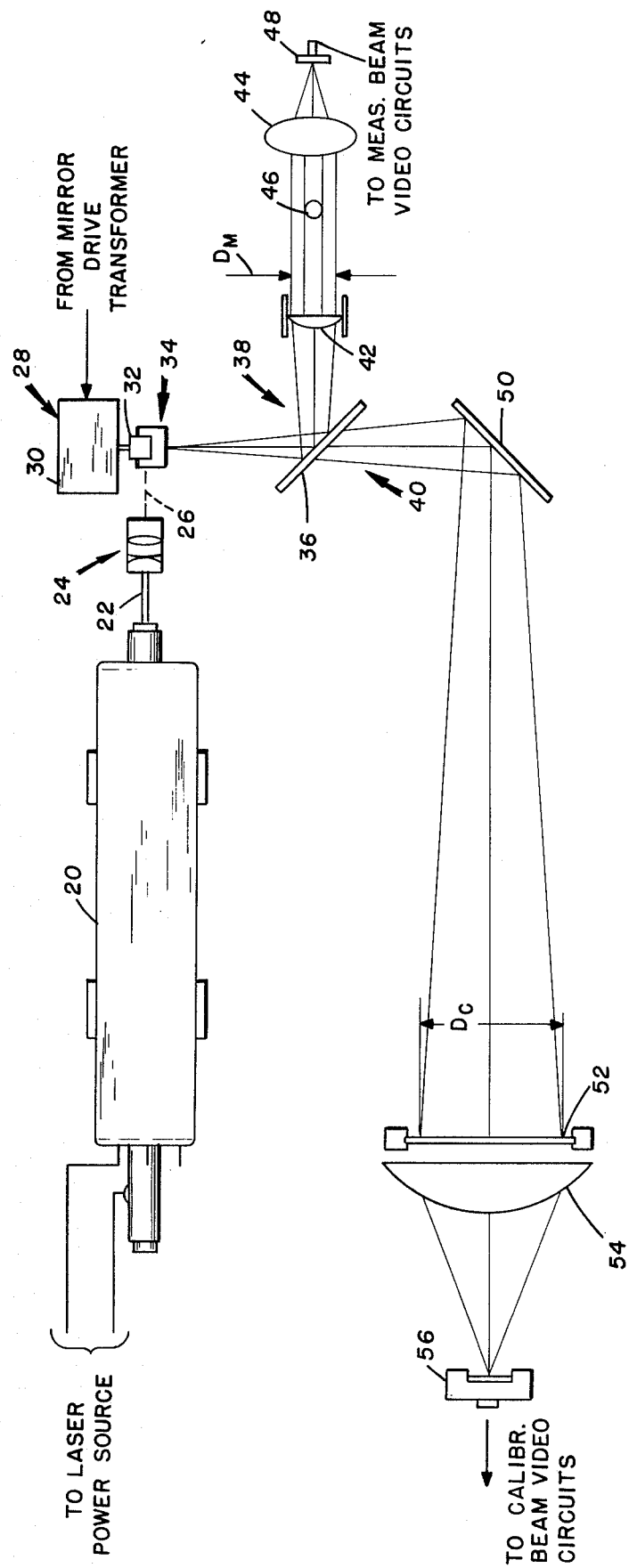
FIG. 1 is a schematic representation of a gauging system according to this invention.

Referring first to FIG. 1, there is shown the essential mechanical features of the new gauging device. A laser 20, excited by a suitable power source produces a light beam 22. The laser may be of any desired type, such as a 2mw. Helium-Neon device, producing a light beam of about 50 mil diameter. A reducing lens unit 24 positioned in the path of the beam produces a second beam 26 of much smaller, e.g., 15 mil diameter.

Positioned in the path of beam 26 is a beam scanner 28. This is comprised of a scan motor 30 connected by a shaft to a scan mirror 32. Motor 30 maybe of the galvanometric or taut-band type, and is driven through a transformer from available A.C. mains. As will be seen, no highly regulated or other special mirror drive power source is required since system operation is time independent and neither beam velocity nor moderate changes in scan width result in measurement errors.

The scanned beam is reflected from mirror 32 onto another mirror 34 which directs the beam onto a 50% beam splitter 36 to produce a reflected beam 38 and a transmitted beam 40. Reflected beam 38 passes through a collimating lens 42 to produce a set of parallel beams having a scan width $D_m$. As will be appreciated, the resulting scan is a narrow line of constant height $D_m$ (in the plane of the drawing) independent of the position between lens 42 and a receiving lens 44.

As will further be appreciated the space between lenses 42 and 44 defines the measuring region. An object 46, say a wire, the diameter of which is to be measured, is arranged to pass through the measuring region for interception by the measuring beam. For production-line use, the gauge will be positioned at some convenient location, and the wire inspected as it exits a drawing die. As explained more fully below, a particular advantage of this invention is that even if wire 46 is unsupported and thus is subject to vibration or other movement in the direction of beam motion, the system compensates for the motion to eliminate measurement errors.

As shown, the measuring beam impinges on lens 44 which focuses it onto a photo-detector 48. Since the beam is always focused on the detector, the latter is illuminated except when the beam is intercepted by wire 46. The resulting signal at the output of detector 48 is a pulse, the width of which is representative of the wire diameter.

Referring back to beam splitter 36, the transmitted beam 40 impinges on a surface mirror 50 which directs the beam onto the calibrating reticle 52. The beam passes through the reticle and is focused by a cylindrical lens 54 onto a calibration beam photo-detector 56. The light beam interruption pattern produced by reticle 52 results in a signal output from photo-detector 56 which serves to generate the spatial calibration clock as now described in connection with FIGS. 2 and 3.

Figure 2:
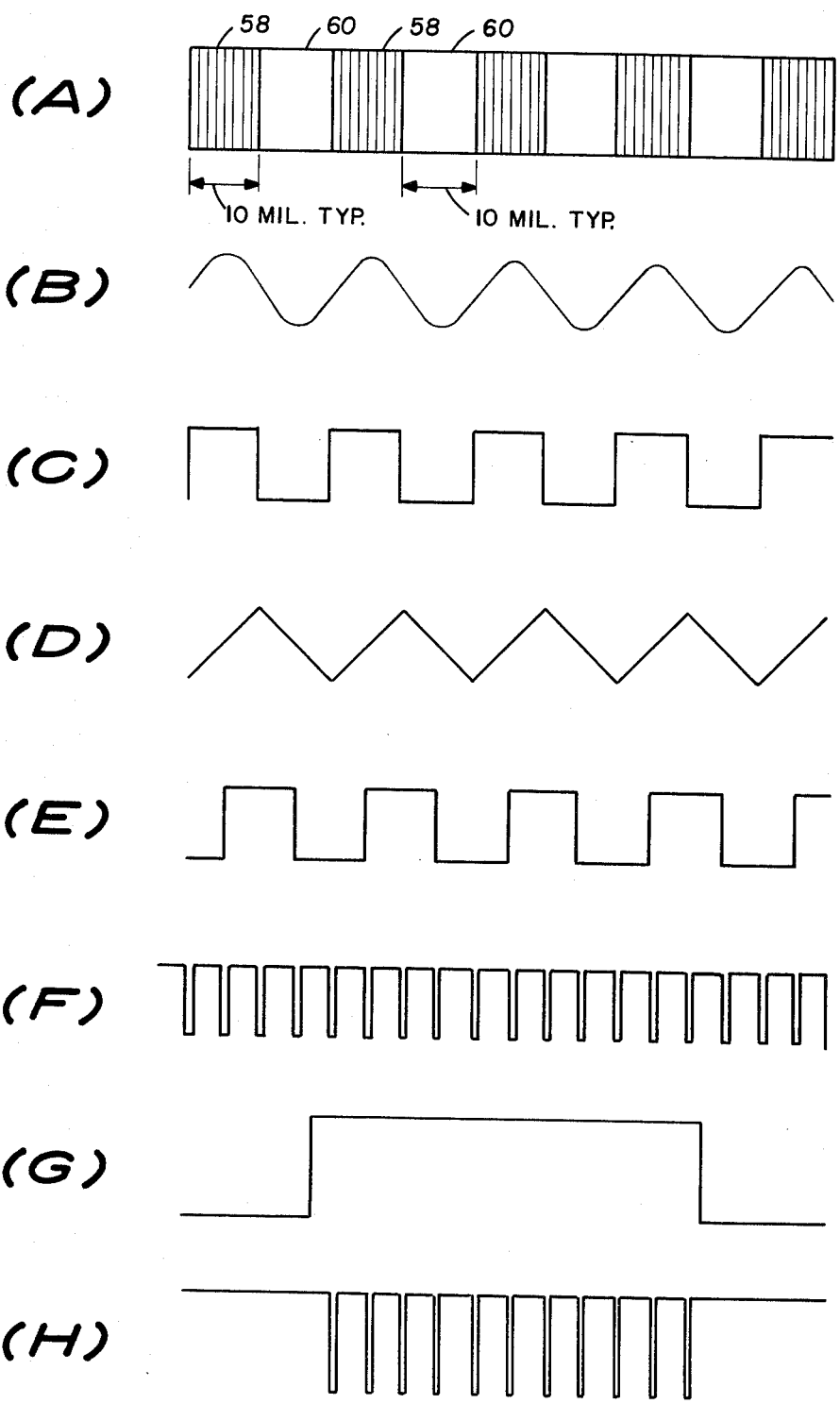
FIG. 2A shows the calibrating reticle used in connection with FIG. 1.
FIGS. 2B-2H are waveform diagrams useful in understanding the operation of the system.

Line A of FIG. 2 shows the construction of reticle 52. As illustrated, the reticle is comprised of alternating opaque regions 58 and transparent regions 60 of nominal 10 mil width. The reticle may be constructed in a variety of ways. For example, good results are even achieved by the simple expedient of photoreduction of a tape drawing made with 0.1 inch tape, and reduced by 10 to 1.

Figure 3:
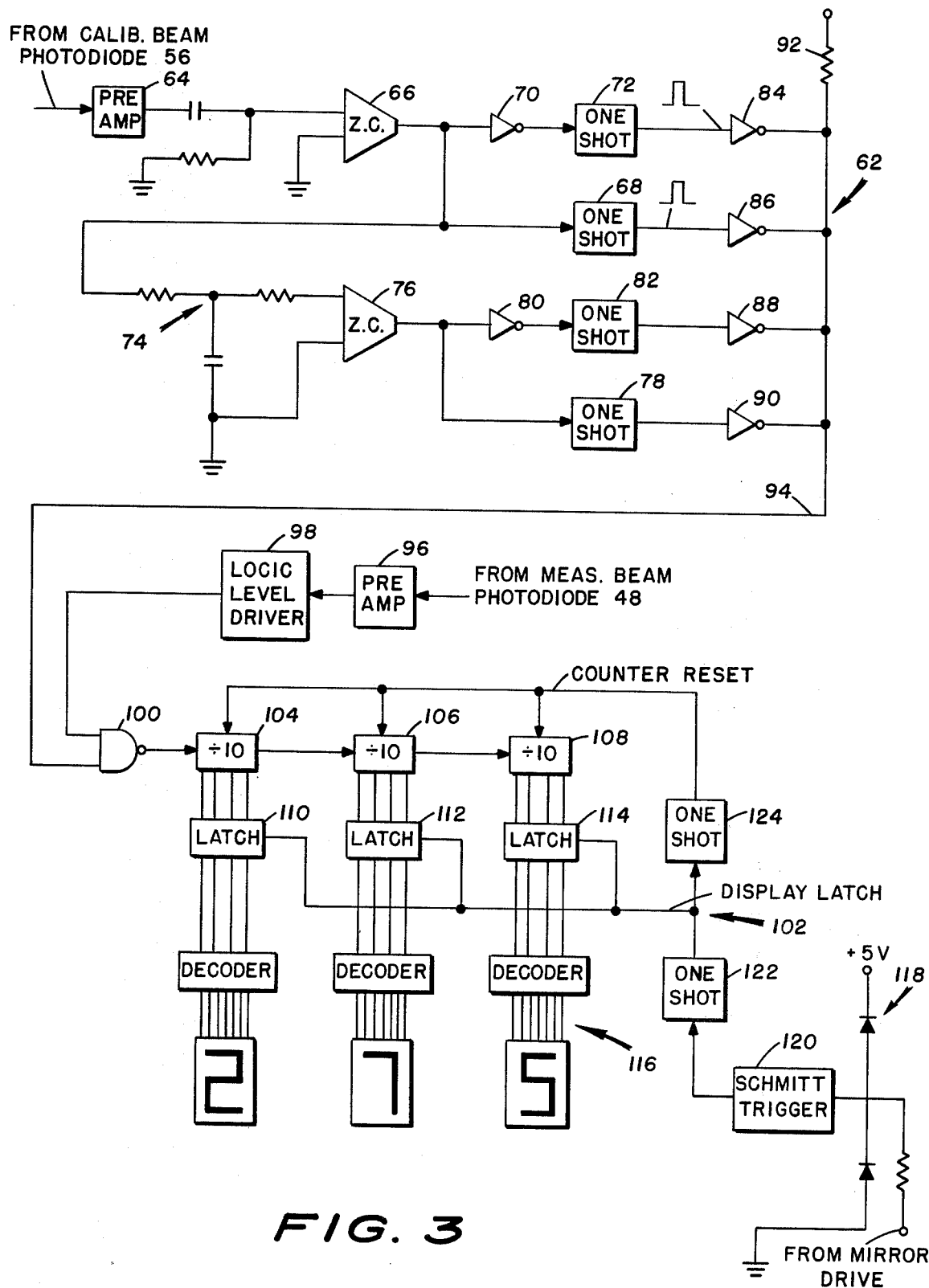
FIG. 3 is a schematic diagram of the electronic portions of the system.

The signal processing circuitry connected to photo-detector 56 is denoted generally at 62 in FIG. 3. The photodiode output is coupled through a preamplifier 64 to a zero crossing detector 66, the output of which is coupled directly to a first single shot 68 and through an inverter 70 to a second single shot 72.

The output of zero crossing detector 66 is also integrated by RC circuit 74, and then connected to a second zero crossing detector 76. This, in turn is directly coupled to a third single shot 78, and through an inverter 80 to a fourth single shot 82. The output of the four single shots are collected by an OR circuit comprised of four inverters 84, 86, 88 and 90, and a resistor 92. The common output is coupled over line 94 to the remainder of the circuitry as described below.

The waveforms generated in circuit 62 are shown in FIG. 2. As a result of the 15 mil diam beam and Gaussian distribution, the beam will generate an intensity pattern signal analog generally sinusoidal in configuration as it scans the reticle, as indicated in FIG. 2B as generated by photo-detector 56. Zero crossing detector 66 converts the sinusodial pattern into a square wave as shown in FIG. 2C with level transition at each opaque-transparent interface. The one shots illustrated respond to positive going input transitions. Thus use of inverter 70 results in a signal on lead 94 for each interface—an output from single shot 68 for each transparent to opaque transition, and an output from single shot 72 for each opaque to transparent transition.

Integrator 74 produces a triangular wave as shown in FIG. 2D with a resulting squarewave output from zero crossing detector 76 as shown in FIG. 2E, 90° out of phase with the square wave shown in FIG. 2C. As may be appreciated the outputs of single shots 78 and 82 are therefore respectively 90° out of phase with the outputs of single shots 68 and 72.

In FIG. 2A, it may be seen that the interfaces between transparent and opaque regions occur every 10 mils along the reticle. Thus single shots 68, 72, 78, and 82 each generate a pulse when the calibrating beam has traveled 20 mils along the reticle. The resulting pulse summation on lead 94 is thus characterized by a spatial frequency of one pulse for every 5 mils of beam travel along the reticle, 200 pulses per inch. This is shown in FIG. 2F.

Referring back to FIG. 1, it will be recalled that the pulse output from measuring beam photo-detector 48 is of duration determined by the diameter to be measured, and of course, by the beam velocity. According to this invention, the velocity dependence is eliminated, and a useful measurement is obtained by counting the calibration pulses while the measuring beam is interrupted by the object being measured. For this purpose, the output of photo-detector 48 is coupled through a preamp 96 (see FIG. 3) and a logic level driver 98 as on input to a NAND circuit 100. Lead 94 provides the second input to the NAND gate. Thus, for a measurement pulse as shown in FIG. 2G, the output of the NAND gate is shown in FIG. 2H. Since the spatial frequency of FIG. 2F is 200 pulse per inch, it may be seen that the 11 pulses at the output of NAND gate 100 represent a beam travel on the reticle of about 55 mils.

It should be recognized however, that the diameter of object 46 is not 55 mils. Referring to FIG. 1, the ratio of the length of the scan lines $Dc/Dm$, i.e. the magnification, depends on the path lengths from the scan mirror to the reticle, and from the scan mirror to the collimating lens. For an object D inches in diameter, while the measuring beam travels a distance D, the calibrating beam travels a distance $DxDc/Dm$, and the number of pulses counted is $200xDxDc/Dm$. As an example, for an object of diameter 1.0 inch, and a magnification of 2.5, the number of pulses counted is 500. This number must, of course, be properly scaled before display or utilization, as described more fully.

Another extremely important consideration noted above is movement of the object being measured. Referring to FIG. 1, the measuring beam travels up and down in the plane of the drawing. If object 46 has no component of motion along the scan line, it does not matter whether a measurement is made with the beam scanning up or down. If however, the object has an up and/or down motion component, this motion will introduce an error in the measurement. Specifically, if the beam and the object are moving in the same direction, the beam will have to travel further to cross the object, and more calibration pulses will be counted. The diameter will therefore appear greater than it actually is. Correspondingly, if the beam and the object are moving in opposite directions, the beam will cross the object in a shorter length of travel, fewer calibrating pulses will be counted, and the diameter will appear reduced.

According to this invention, such velocity induced errors can be significantly reduced by measuring the object for two successive opposite scans and averaging the result. Such an operation can be readily performed with available digital circuitry as will be apparent to one skilled in the art from the above description. In addition, however, by proper selection of reticle dimensions, magnification, and output scaling logic, it has been found possible to accomplish the required averaging without any additional circuitry. As noted above, for the 10 mil reticle and the 2.5 magnification, a 1 inch scan produces a count of 500 calibration pulses. This would be true only if the object has no component of motion in the scan direction. In FIG. 1, if the object has a motion component upward in the planes of the drawing there will be a count smaller than 500 for an downward scan, and a count larger than 500 for an upward scan. However, as long as the object velocity is relatively small compared to the beam velocity, two successive scans, i.e. back and forth should result in a total count of 1000 pulses. Thus, if the count is accumulated for two scans and a direct read out provided at the end of the two scans, the total count displayed is the average diameter in mils.

The benefit derived from the foregoing may be appreciated as follows: For an object of diameter D having a velocity component along the scan line such that the ratio of the object speed to the beam scan speed is R, the measurement obtained for the beam and the object moving in the same direction is $D/1-R$, and $D/1+R$ for the opposite direction. Averaging the result of two successive scans, the measurement obtained is $D/1-R^2$. For a typical value of R of 0.1, errors of 11%, −9%, and 1% respectively result. Comparably small errors with single direction scans would require 10 times greater scan velocity.

This highly desirable and simple means of achieving an averaging is accomplished by the circuitry generally denoted at 102 in FIG. 3. Included are three series divide by ten counters 104, 106 and 108, three associated latch circuits 110, 112 and 114, and a three digit decoderbar segment display generally denoted at 116. Counter reset and display update are controlled by the mirror drive sinusoid coupled through a diode circuit 118, a Schmitt Trigger 120, and a drive signal so that Schmitt Trigger 120 produces a single positive transition for each full mirror drive cycle, in other words, for each back and forth scan. The output pulse from single shot 122 updates the storage latch units 110–114 and also triggers single shot 124. This, in turn, resets counters 104–108 in preparation for the next count cycle.

Counter chain 104–108 has a maximum capacity of 999 counts, as does display unit 116, so the count displayed is the required average diameter. The 55 pulse count for one scan displayed in FIG. 2H therefore represents a measured average diameter of $2 \times 2.5 \times 11 = 55$ mils and wherein:

2 = scan in both directions
2.5 = effective reticle spacing, and
11 = reticle pulse count.

For the circuit shown in FIG. 3 the display is updated every complete scan. For a 60 Hz drive, it will be appreciated that the display will be updated every 1/60 sec. If desired, such rapid updating can be slowed by use of an averaging divider between Schmitt Trigger 120 and single shot 122, and a like divider between NAND gate 100 and counter 104. Any desired division rate can be employed. For example, a division rate of 1/60 would produce an update every second.

Figure 4:
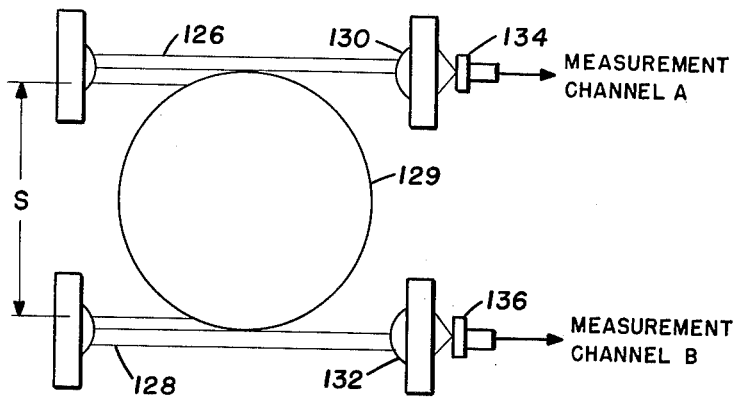
FIG. 4 is a schematic representation of an alternative embodiment using two gauges for measurement of large diameters.

Another particularly important feature of the invention is the adaptability to a variety of applications. Several of these are illustrated schematically in FIGS. 4–9. For example, where large dimensions are to be measured, two units of the type shown in FIG. 1 may be combined as illustrated in FIG. 4. Here two separate measurement beams are established to encounter opposite sides of a large object 129 such as a sewer pipe. A pair of collecting lenses 130 and 132, respectively associated with photodetectors 134 and 136 provide channel A and channel B pulses representing the portion of each beam scan (back and forth) that the object 129 occults the beam. Separate reticles and associated beams (not shown) are likewise provided.

Figure 5:
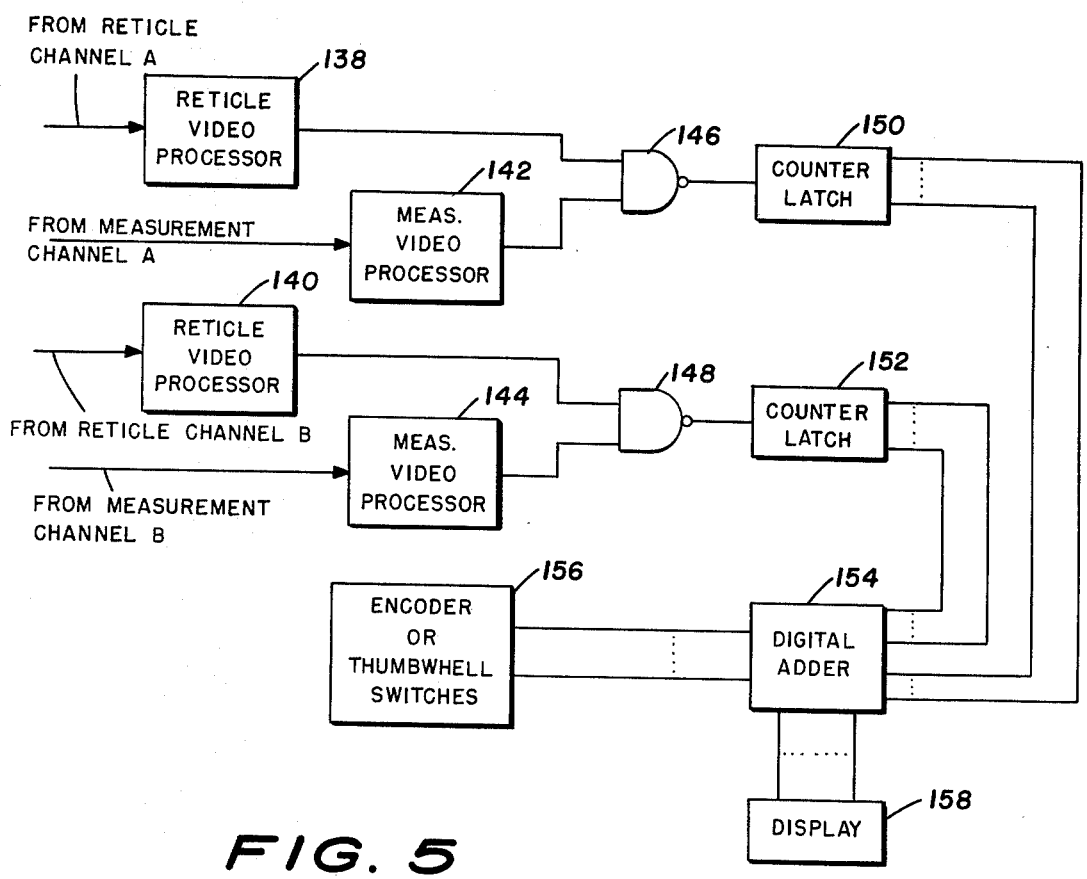
FIG. 5 is a schematic diagram of the electronics for the embodiment of FIG. 4.

A preferred form of processing circuitry is shown in FIG. 5. A pair of reticle video processors 138 and 140 like circuit 62 in FIG. 3, and respective measurement video processors 142 and 144 are coupled to separate NAND gates 146 and 148. (The processors 142 and 144 include preamps and drivers like units 96 and 98 in FIG. 3.)

The resulting pulse counts are stored in counter-latch units 150 and 152, and then connected to a digital adder 154. The latter is also fed by an encoder or thumbwheel set. This provides a measure of the spacing S (see FIG. 4) between the optical units. The resulting summation, presented by display unit 158, allows diameter measurement for very large objects.

Figure 6:
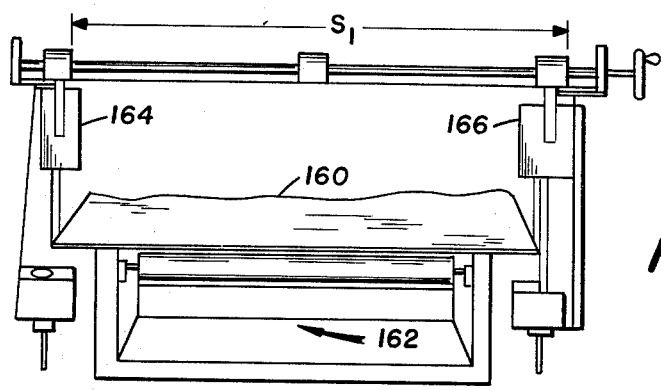
FIG. 6 is a schematic of another embodiment for measuring sheet width.

Another application, illustrated in FIG. 6 is sheet width measurement. For this, a sheet 160 to be measured is carried by a conveyor 162. A pair of optical gauging units 164 and 166 are positioned to generate beams intercepting the edges of the sheet. Signal processing as described in connection with FIG. 5, and taking into account the gauge spacing $S_1$, is employed to obtain the desired measurement.

Figure 7:
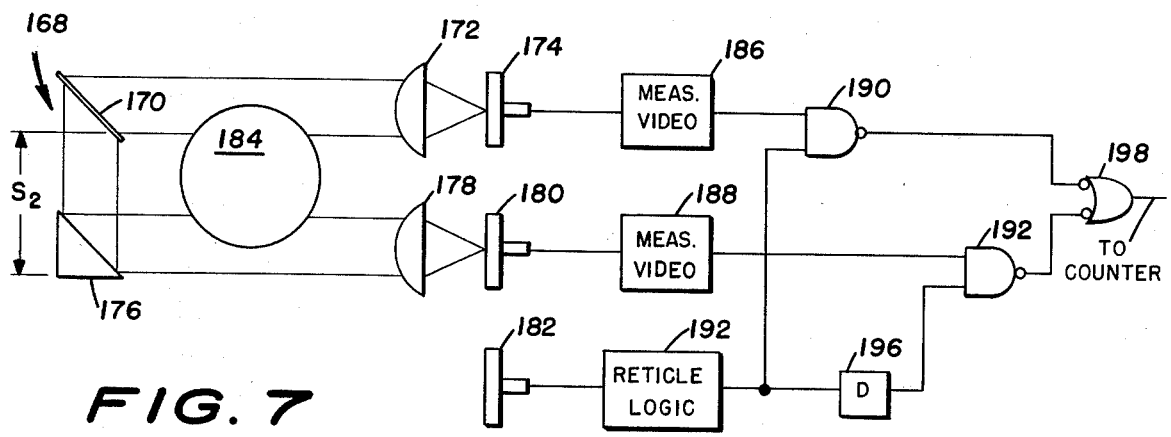
FIGS. 7 and 8 are further alternative embodiments useful in measuring moderately large objects.

The embodiment of FIGS. 4 through 6 are particularly useful for measuring very large objects, e.g., several feet, while the embodiment of FIGS. 1 through 3 are particularly useful for small objects, less than 1 inch. For intermediate size objects it is possible to use a single laser to generate two separate measuring beams. In FIG. 7, a single measuring beam 168 strikes a 50% beam splitter 170. The transmitted beam passes through a focusing lens 172 to a photodetector 174. The reflected beam portion passes through a lens 178 to a detector 180. The reticle beam is generated as before and excites calibration photodetector 182.

As object 184 intercepts the two beams as before so that measurement video pulses are generated by circuits 186 and 188 to control a pair of NAND gates 190 and 192.

Measurement requires a determination of beam travel distance over which both beams are occulted by object 184. Happily, it has been found that the logic for this purpose can be quite simple.

Since only the number of reticle pulses, rather than the precise time of occurrence is of concern, and since both measuring beams are synchronous with the calibration beam, the two separate measuring pulses can be used to count the same reticle pulses. For this purpose, the pulses generated by the calibration logic circuit 194 are connected directly to NAND gate 190, and through a delay 196 to NAND gate 192. The delay interval is slightly more than the pulse width, which assures that the outputs of NAND gates do not occur simultaneously. This allows the NAND gate outputs to be digitally added by the simple expedient of an OR gate 198. The latter drives a counter-latch-display arrangement such as previously described, the beam spacing $S_2$ being added to provide the actual object measurement.

Figure 8:
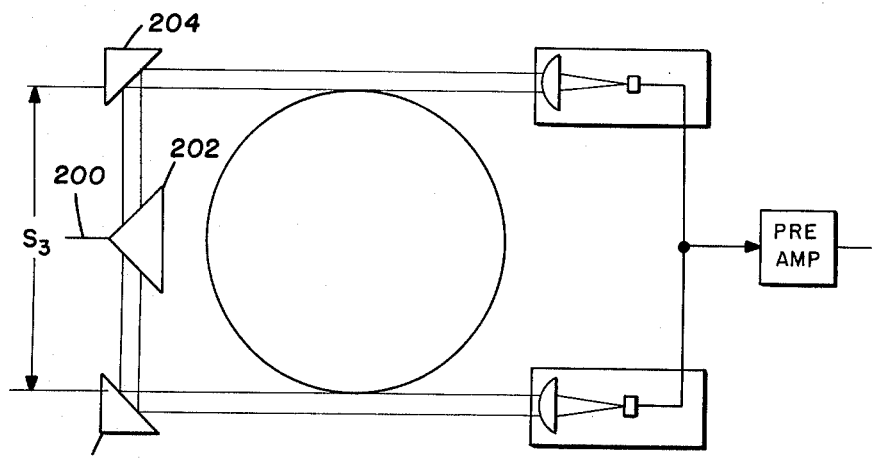

An arrangement similar to that of FIG. 7 is shown in FIG. 8. Here, a single beam 200 is split by a reflecting prism 202 and then directed across the measuring field by a pair of reflectors 204 and 206. The resulting beams 208 and 210 are one-half as wise as in the embodiment of FIG. 7, thus limiting by 50% the measuring range. However, some circuit economy is derived in that only a single processing channel is required. The data is of course corrected by beam spacing $S_3$ before display.

The arrangements shown in FIGS. 7 and 8 are especially useful where moderately large dimensions are involves due to practical limits on scan width for the embodiment of FIGS. 1-3. However, limits on the spacing $S_2$ or $S_3$, due to mechanical problems of fixturing etc. make the embodiments of FIGS. 4 through 6 more desirable for spacings in excess of perhaps 1 foot.

Figure 9:
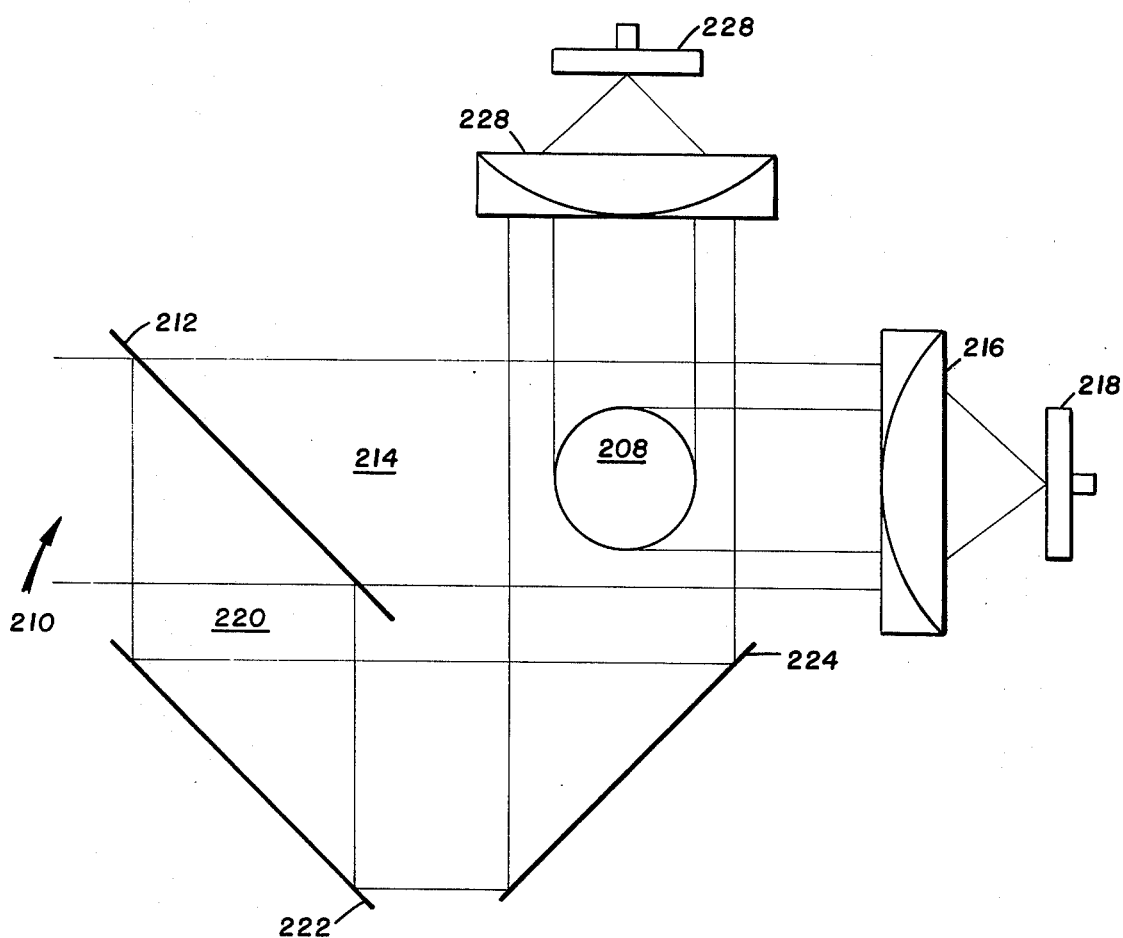
FIG. 9 is yet another embodiment useful for simultaneous two axes measurement.

Yet another useful application for this invention is shown in FIG. 9, wherein two axis diameter measurement is desired. For this application, a single measuring beam 210 strikes a 50% beam splitter 212. The transmitted beam 214 passes through lens 216 to detector 218. The reflected beam 220, however, strikes a pair of 45° reflectors 222 and 224, and is then directed at 90° to transmitted beam 214. A second lens 226 and photodetector 228 are positioned to receive beam 220. In this way orthogonal diameter measurements of $Dx$ and $Dy$ can be made. As will be appreciated, the quantity $(Dx + Dy)/2$ is a measure of the average diameter. Logic circuitry as illustrated in FIG. 7 maybe employed in this application. Of course, beam spacing correction is not necessary, but an extra divide by two circuit is required after summation.

Other embodiments and applications, as well as mechanical and electronic variations will be apparent to one skilled in the art from the above description. It should thus be appreciated that the description is intended only as illustrative and not limiting, the scope of the invention being set forth in the appended claims.

We claim:

1. An optical gauging system comprising: a laser; a mirror positioned in the path of the laser beam, and means for oscillating said mirror to periodically change the angle of incidence of the laser beam to produce a periodic scan; beam splitter means for splitting the scanned beam into a measuring beam and a calibration beam; a collimating lens in the path of said reflected beam to produce a beam, with a parallel scan said collimating lens positioned to direct said collimated parallel scanning beam onto an object with the beam scan in the direction of a dimension of the object which is to be measured; means for generating a measuring signal representative of the portion of the scan cycle during which the object occults the measuring beam; calibrating means including a reticle positioned in the path of the calibration beam for alternately occulting and transmitting said beam as it sweeps said reticle, wherein the distance swept by the calibration beam in the plane of the reticle is larger than the distance swept by the parallel scanning measuring beam in the plane of the object; a lens positioned beyond said reticle and a photodetector positioned at the focal point of said lens whereby the output of said photodetector is a spatially periodic electrical signal representative of the reticle band pattern; and means responsive to said measuring signal for counting the number of calibrating pulses generated while said measuring beam is occulted by the object under inspection.

2. Apparatus as defined in claim 2 wherein said means for oscillating said mirror comprises drive means and means for powering said drive means from the A.C. mains.

3. Apparatus as defined in claim 1 wherein said means for directing said measuring beam onto said object comprises a collimating lens whereby said measuring beam scans said object along a succession of parallel paths.

4. Apparatus as described in claim 1 wherein said calibrating means further comprises photodetector means in the path of said calibrating beam following said optical means to generate an electrical analog of the transmission pattern of said calibration beam through said optical means; means connected to said photodetector for sensing the portions of said electrical analog corresponding to the transitions between ocultation and transmission of said beam; and means for generating a succession of pulses corresponding to said transitions.

5. Apparatus as defined in claim 4 further including means responsive to portions of said electrical analog intermediate said beam transitions for generating additional pulses; and means for combining said additional pulses and said transition pulses into a pulse train.

6. Apparatus as defined in claim 5 wherein said means for generating said measuring signal comprises photodetector means, and means connected to said photodetector for generating pulses having sharply defined transitions corresponding to encounters of said measuring beam with the edges of the object being measured.

7. Apparatus as defined in claim 6 wherein said counting means includes gate means controlled by said measuring signal for passing said pulse train, a counter connected to said gate means; display means connected to said counter; and control means responsive to the laser beam scan for controlling the operating cycle of the counting means.

8. Apparatus as defined in claim 7 wherein the path length of the measuring and scanning beams and said increment of beam motion are so selected that the count accumulated for one counting means operating cycle is equal to the measured dimension in appropriate linear units.

9. Apparatus as defined in claim 8 wherein said deflecting means produces a bidirectional scan, wherein said counting means operating cycle constitutes two successive scans, and wherein the count displayed is the average value of the measured dimension for said two scans.

10. Apparatus as defined in claim 7 wherein said deflecting means includes means to generate a sinusoidal drive signal; and wherein said operating cycle control means comprises means responsive to each period of said drive signal for updating said display means and thereafter for resetting said counter.

11. Apparatus as defined in claim 7 further including averaging means comprised of a first divider connected between said gate and said counter and a second like divider in said operating cycle control means.

12. Apparatus as described in claim 1 wherein said calibrating means further comprises means connected to said photodetector for sensing the portions of said electrical signal corresponding to the interfaces between transparent and opaque bands in said reticle; and means for generating a succession of pulses corresponding to said interfaces.

13. Apparatus as described in claim 1 wherein said electrical signal includes a succession of high and low peaks corresponding to the centers of successive transparent and opaque reticle bands, and zero crossings corresponding to the interfaces between opaque and transparent reticle bands; and wherein said calibrating means further includes first detector means to generate a square wave with level transitions at said zero crossings; means connected to said first detector to generate a pulse for each level transition; second detector means to generate a second square wave with level transitions at said high and low peaks; means connected to said second detector to generate a pulse for each level transition of said second squarewave; and means to collect all of said transition pulses into a pulse train.

14. Apparatus as described in claim 13 wherein said means for generating said measuring signal comprises a second photodetector and means connected to said photodetector to generate a pulse having a sharply defined transition corresponding to encounter of said measuring beam with the edge of said object.

15. Apparatus as described in claim 14 wherein said counting means includes gate means controlled by said measuring signal for passing said pulse train, a counter connected to said gate means; display means connected to said counter; and control means responsive to the laser beam scan for controlling the operating cycle of the counting means.

16. Apparatus as defined in claim 15 wherein the path length of the measuring and scanning beams and said increment of beam motion are so selected that the count accumulated for one counting means operating cycle is equal to the measured dimension in appropriate linear units.

17. Apparatus as defined in claim 16 wherein said deflecting means produces a bidirectional scan, wherein said counting means operating cycle constitutes two successive scans, and wherein the count displayed is the average value of the measured dimension for said two scans.

18. Apparatus as defined in claim 13 wherein said deflecting means includes means to generate a sinusoidal drive signal; and wherein said operating cycle control means comprises means responsive to each period of said drive signal for updating said display means and thereafter for resetting said counter.

19. Apparatus as defined in claim 13 further including averaging means comprised of a first divider connected between said gate and said counter and a second like divider in said operating cycle control means.

20. Apparatus as described in claim 1 further comprising a second optical gauging system; said first and second systems being positioned apart by a spacing S comparable to the dimension being measured; each system providing respective measuring beams and calibrating beams, and corresponding measuring signals and calibration pulses; means coupled to the counting means for each system for adding the stored counts for each channel; offset means for coupling a count corresponding to said spacing S to said adding means; and display means connected to said adder.

21. Apparatus as described in claim 1 further including means to split said measuring beam into two parallel spaced apart components, and for directing said beams toward opposite sides of the dimension of said object being measured.

22. Apparatus as defined in claim 21 wherein said splitting means divides said measuring beam into two axially symmetrical portions, each one-half the width of the measuring beam itself, and further including photodetectors for each beam component, and means to combine the outputs of said two photodetectors.

23. Apparatus as defined in claim 21 wherein said splitting means comprises a partially transmissive reflector, and further including means to generate a separate component of said measuring signal for each beam component; and wherein said counting means comprises first and second coincidence gate means, respectively controlled by said measuring signal components, delay means, said calibrating signal being coupled directly to said first gate means, and to said second gate means through said delay; a counter and means for additively coupling the outputs of said gates to said counter.

24. Apparatus as described in claim 1 further including means to split said measuring beam into two components, and means for directing said beams orthogonally toward an object to measured in two dimensions, means to generate a separate component of said measuring signal for each beam component; and wherein said counting means comprises first and second coincidence gate means, respectively controlled by said measuring signal components, delay means, said calibrating signal being coupled directly to said first gate means, and to said second gate means through said delay; a counter and means for additively coupling the outputs of said gates to said counter.

* * * * *